United States Patent Office 3,528,633
Patented Sept. 15, 1970

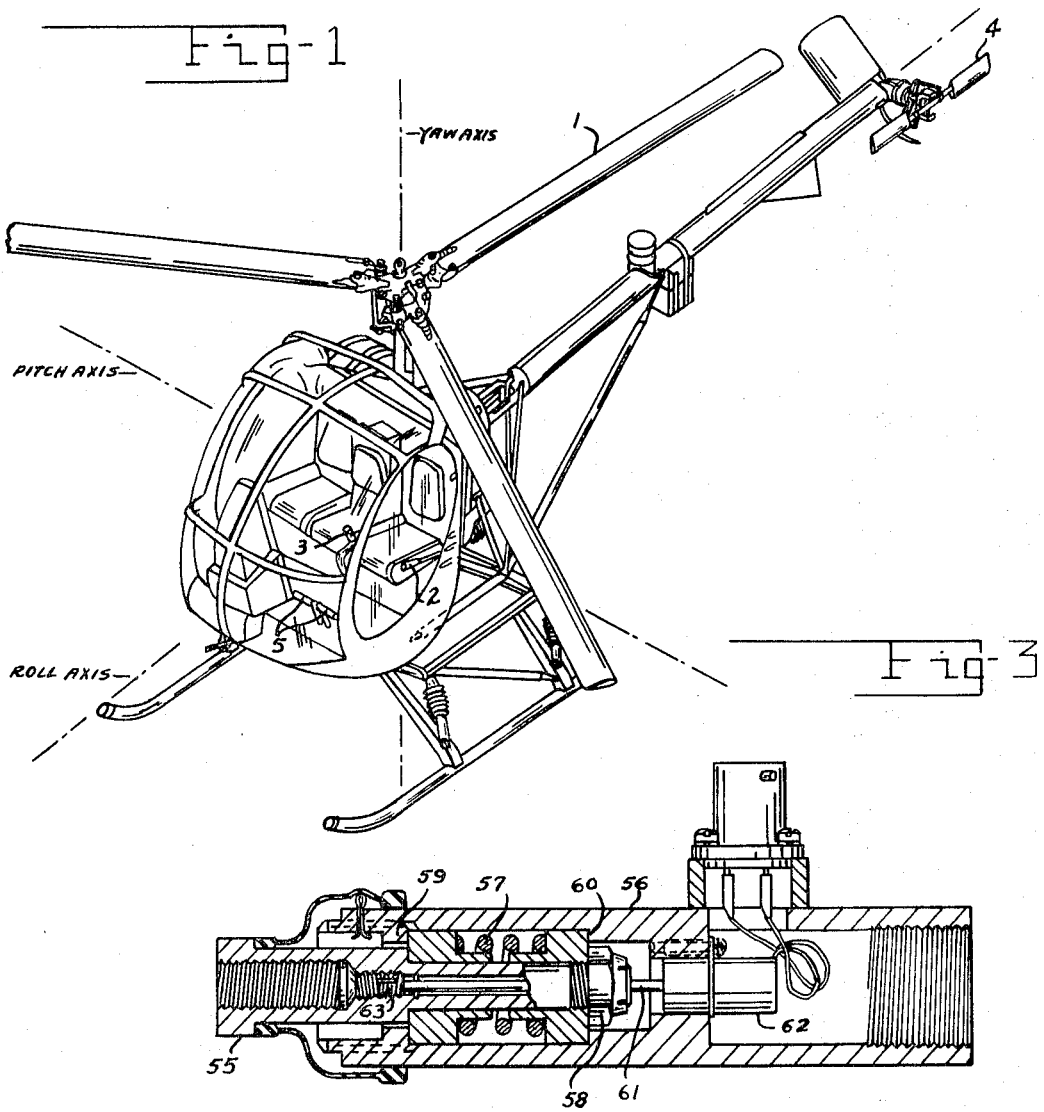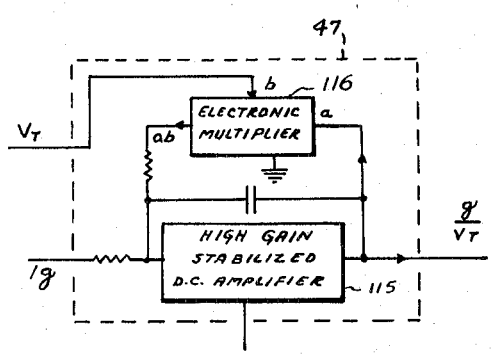

3,528,633
SYSTEM FOR CONTROLLING AND STABILIZING AN AIRCRAFT IN YAW
Siegfried Knemeyer, P.O. Box 123,
Yellow Springs, Ohio 45387
Filed Nov. 14, 1967, Ser. No. 683,436
Int. Cl. B64c 13/18
U.S. Cl. 244—77                    2 Claims

ABSTRACT OF THE DISCLOSURE

A pilot assist yaw control system which, in the presence of a pilot produced force on the manual yaw control, applies a control signal to a yaw servo proportional to the difference between the force and the yaw rate to produce a yaw rate proportional to the force; and which, in the absence of a pilot force on the manual yaw control, applies a control signal to the yaw servo proportional to the sum of the yaw rate and the time integral of the yaw rate for stabilizing the aircraft in the yaw direction it had when the pilot force was removed. In addition, turn coordination is provided by applying to the yaw servo a control signal proportional to a yaw rate computed as a function of true airspeed and bank angle whenever, as determined by a switching logic receiving true airspeed, bank angle, and yaw rate as inputs, the true airspeed exceeds a preset low cruise speed; or, if the airspeed lies between low cruise and a preset lower airspeed, whenever the pilot introduces through the manual roll and yaw controls both a bank angle and a yaw rate in the direction of the desired turn in excess of preset small values.

BACKGROUND OF THE INVENTION

The invention relates to flight control systems and particularly to controlling the movements of an aircraft about its yaw axis. It is applicable to all types of aircraft but is particularly applicable to helicopters and other VTOL (vertical takeoff and landing) aircraft where precise maneuvering close to the ground at low or zero forward speed is required.

Present yaw stabilization systems provide either rate damping or directional control in the case of a fully automatic flight control system. Conventional rate damping systems can not discriminate between pilot induced maneuvers and externally induced disturbances with the result that the stabilization system opposes any changes the pilot introduces through the primary manual control system of the aircraft. In the case of fully automatic flight control systems, the pilot cannot introduce commands through the aircraft's primary manual controls at all, but must do so through the autopilot controls which are separate and distinct from the manual controls. Consequently, in present systems, a high degree of stability is incompatible with a high degree of maneuverability. Further, present automatic systems do not provide the pilot with the option of making either a coordinated turn or a slipping directional maneuver (or lateral movement in the case of helicopters and the like) without departing from normal manual control piloting procedures.

SUMMARY OF THE INVENTION

The purpose of the invention is to provide a yaw control system providing a high degree of directional stability without loss of maneuverability and which permits the pilot to be in full control of the aircraft at all times through the primary manual control system without the necessity for operating or setting other controls such as those of an autopilot. A further purpose is to provide, as a part of the control system, automatic turn coordination selective to the pilot through his inputs to the manual controls.

Briefly, the system accomplishes the above purposes by sensing the force applied by the pilot to the manual yaw control. If force is present, a control signal proportional to the difference between the force and the yaw rate is applied to a yaw servo system to produce a yaw rate proportional to the force. If force is absent, a control signal proportional to the sum of the yaw rate and the time integral of the yaw rate is applied to the yaw servo to stabilize the aircraft in the yaw direction it had at the time the pilot force was removed. For turn coordination, a switching logic is provided having true airspeed, bank angle and yaw rate as inputs. The logic operates to apply a control signal proportional to the computed coordinated turn yaw rate to the yaw servo whenever the airspeed is above a preset low cruise value and the pilot introduces a bank angle through the manual controls in the direction of the desired turn, or, if the airspeed lies between low cruise and a preset lower value below which turn coordination is not employed, whenever the pilot introduces through the manual control a bank angle and a yaw rate in the turn direction above preset small values.

BRIEF DESCRIPTION OF THE DRAWING

FIG. 1 shows a typical small helicopter to which the invention may be applied;

FIG. 3 is a cross section of a pilot force sensor;

FIG. 7 shows details of the divider 47 of FIG. 2.

DESCRIPTION OF THE PREFERRED EMBODIMENT

Figure 2:
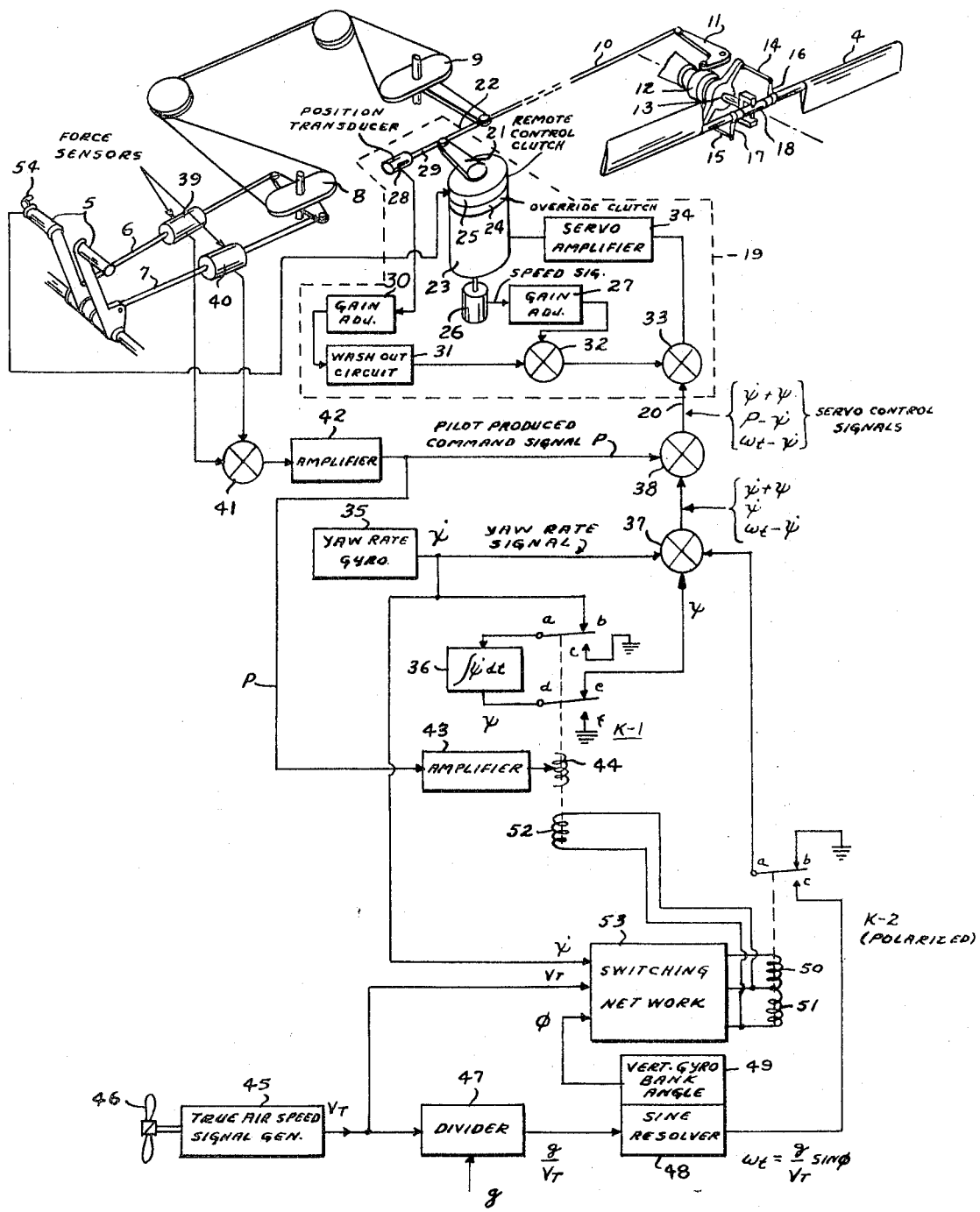
FIG. 2 is a functional block diagram of the yaw control and stabilization system.

FIG. 1 shows a typical small helicopter which will serve to illustrate the manner in which the invention is applied to this type of aircraft. The main rotor 1 provides both lift and directional motion to the helicopter. Lift is controlled by controlling the thrust of the main rotor through collectively or equally varying the pitch of the main rotor blades. The pilot accomplishes this by the collective control stick 2 which is coupled to a rotating swash plate located beneath the main rotor hub and connected by links to crank arms on the blade hubs for changing the blade pitch. The collective stick moves the swash plate up or down without changing its tilt so as to collectively increase or decrease the steady component of the blade pitch. Directional motion is controlled by changing the thrust direction of the main rotor away from the vertical to provide a horizontal component of thrust in the desired direction. The main rotor thrust is always normal to the disc of the rotating rotor blades. Therefore it may be tilted away from the vertical by tilting the disc away from the horizontal. The disc may be tilted in any angular direction by introducing a cyclic variation of the rotor blade pitch between maximum and minimum values 180° apart, the amount of tilt being determined by the amplitude of the pitch variation and the direction of the tilt by the angular position of the diameter through the maximum and minimum points. The pilot effects this control of the thrust direction by the cyclic control stick 3 which is also coupled to the above-mentioned swash plate and serves to control the magnitude and direction of its tilt, thereby superimposing a cyclic variation of the blade pitch on the steady pitch component established by the collective control 2.

The torque driving the main rotor reacts on the helicopter body tending to rotate it in the opposite direction. The tail rotor 4 serves the dual function of counteracting this torque and providing a control whereby the helicopter can be turned about its yaw axis. As in the case of the main rotor, the thrust of the tail rotor is controlled by changing the pitch of the rotor blades, which the pilot accomplishes through the tail rotor control pedals 5. The blades are designed with a neutral pitch setting just sufficient to counteract the main rotor torque when the helicopter is hovering under full load. Yaw control is effected by increasing or decreasing the pitch from this neutral value.

This invention is concerned with the yaw control system, the mechanical aspects of which are shown more clearly in FIG. 2. Pedals 5 are mechanically connected together through pull rods 6 and 7 and bellcrank and pulley assembly 8 which in turn is mechanically coupled through a second bellcrank and pulley assembly 9, push rod 10, and bellcrank 11 to collar 12. Swash plate 31 is carried in a bearing in collar 12 and is coupled by links 14 and 15 to pitch control arms 16 and 17 on the two blades of tail rotor 4. Pressure applied to pedals 5 moves collar 12 and swash plate 13 axially of the tail rotor shaft for controlling the blade pitch through arms 16 and 17. The pitch adjusting force is applied against a torsion bar which connects the two blades through tail rotor hub 18, the torsion bar being unstressed for neutral blade pitch which, as stated earlier, is such as to just counteract the main motor torque for hovering at full load.

A functional diagram, mostly in block one-line form, of the yaw stabilization and control system constituting the invention is also shown in FIG. 2. In this diagram, 19 represents a servomechanism having as its input, on line 20, a servo control signal carrying magnitude and sense information, and having as its output the movement of a crank arm 21 at a speed called for by the magnitude information in the control signal and in the direction called for by sense information in the control signal. The arm 21 is mechanically coupled to the tail rotor pitch control mechanism by a link 22 and is driven by a servomotor 23 through override clutch 24 and a remotely controlled clutch 25. Two negative feedback signals are provided from the output to the input of the servo system. One is a signal proportional to servomotor speed. It is provided by tachometer 26 and is adjustable in magnitude by gain adjuster 27. The other is a signal proportional to the instantaneous value of the time integral of the rate of change of position of arm 21 taken from the position in which it last stopped, it being provided that the integral decay to zero within a very short interval after the arm has stopped in any position. The latter feedback signal is provided by a circuit comprising position transducer 28, which is coupled to arm 21 by link 29, gain adjuster 30, and washout circuit 31. Transducer 28 produces a signal representing the magnitude and sense of the displacement of arm 21 from its neutral position, which is the position for which the tail rotor blades have the already described neutral pitch. The washout circuit 31 consists essentially of a differentiating circuit for obtaining the derivative of the output signal of transducer 28 and an integrating circuit for obtaining the time integral of this derivative. Since the derivative of a signal of constant magnitude is zero, there is no output from circuit 31 when arm 21 is stationary, although there is an output from transducer 28 if the arm is in other than its neutral position. Therefore it may be said that the steady component of the transducer output signal is washed out by circuit 31. The two feedback signals are added at summation point 32 and their sum subtracted from the servo control signal at summation point 33. The difference in these two signals forms the input to servo amplifier 34 which provides the energy to drive servomotor 23. The speed derived feedback signal tends to make the servomotor run at a speed proportional to the magnitude of the input signal on line 20, whereas the feedback from washout circuit 31 tends to reduce speed as the distance traveled by arm 21 increases. This permits rapid starts with reduced tendency to overshoot in stopping.

What has been described above within the boundary of element 19 is generally referred to as the minor servo loop. Its entire purpose is to insure the smooth and efficient operation of servomotor 23 in response to the servo control signal on line 20. That part of the system lying outside element 19, usually referred to as the major servo loop, will now be described.

In the absence of any force applied by the pilot to the tail rotor pitch control pedals 5, the helicopter is tightly stabilized in yaw by an input to the servomechanism 19 produced by yaw rate gyro 35 and integrator 36. Any force tending to cause the helicopter to rotate about its yaw axis, such as a change in main rotor torque or a gust of wind, results in a yaw rate signal $\dot{\psi}$ from the rate gyro 35 proportional to the rate of angular change and containing sense information indicating the direction of the angular change. This signal is applied to summing point 37 and through normally closed contacts $a$–$b$ of relay K–1 to integrator 36. The integrator derives the time integral $\psi$ of the yaw rate $\dot{\psi}$, which integral is proportional to the angle through which the helicopter has been forced to turn by the disturbing force. The $\psi$ signal, which also contains sense information, is applied through normally closed contacts $d$–$e$ of K–1 to summing points 37 where it is added to $\dot{\psi}$. The sum $\dot{\psi}+\psi$ is then applied through summing point 38 as a control signal to servomechanism 19. This signal causes the servomechanism to change the tail rotor blade pitch in the proper direction to oppose the initial angular disturbance. The $\dot{\psi}$ portion of the signal exerts an immediate damping influence against the angular change but can not cancel any change that actually occurs since it becomes zero when the change rate has been reduced to zero. The $\psi$ portion on the other hand represents the actual angular displacement that took place and persists as an error signal until the helicopter has been counterrotated to the angular direction it had before the disturbance occurred. In this process the counterrotation causes the sense information in $\dot{\psi}$ to reverse. This reverses the sense of the integrator 36 output which causes the original $\psi$ signal to be reduced to zero as the aircraft turns in the reverse direction about its yaw axis to its original direction. In the return rotation the rate signal $\dot{\psi}$ again acts as a damping factor since its sense direction in this case is opposite to that of the still existing $\psi$ signal with the result that the net error signal to servomechanism 19 is reduced at the summation point 37.

If the gain or sensitivity of the above described yaw stabilization system is sufficiently high, the helicopter is very tightly tied to whatever angular direction it has at the time and can not be easily forced from it by disturbing influences. This is of particular value in slow speed flight, precise landings and take-offs, and other critical situations since even large changes in main rotor torque or other disturbing influences will not change the angular direction of the craft. This allows the pilot to pay a minimum of attention to the yaw axis controls, which is the most critical of the three helicopter controls, and to use the pedals only to effect a desired change in angular direction.

When the pilot wishes to turn the helicopter about its yaw axis he applies pressure to the right or left pedal 5 depending upon the desired turn direction. This force is transmitted through pull rod 6 or 7 to bellcrank and pulley assembly 8 and thence to the pitch control mechanism of the tail rotor in the manner already described. The pilot receives assistance in this action from servomechanism 19 which receives a control signal from force sensors 39 and 40. In the pedal mechanism shown in FIG. 2, only tensional forces are applied to rods 6 and 7, and sensors 39 and 40 produce signals proportional to these forces. The two force sensor outputs are combined in oposition at summing point 41 in order that the resulting difference signal will contain sense information indicating which pedal is receiving the greater pressure, and also in order that the magnitude of the difference signal will be proportional to the net pedal pressure since the pilot may simply apply more pressure to one pedal than the other. The difference signal is applied to the input of amplifier 42 which has a threshold for rejecting spurious or "noise" signals such as those produced by vibration. When the difference signal exceeds the amplifier 42 threshold, an output signal P, designated the pilot produced command signal, appears at the amplifier output and is applied to summing point 38. The command signal is also applied to the input of amplifier 43 which has its output connected to an actuating coil 44 of relay K–1. The gain of amplifier 43 is such that any significant command signal at the output of amplifier 42 will actuate K–1 and open contacts $a$–$b$ and $d$–$e$, removing the integrator 36 from the control circuit and at the same time grounding the integrator input and output circuits through contacts $a$–$c$ and $d$–$f$.

The command signal is applied to summing point 38 where the yaw rate signal $\dot{\psi}$, if any, produced by rate gyro 35 is substracted from it and the algebraic difference $P - \dot{\psi}$ applied as a control signal to servomechanism 19. There are three initial possibilities for $\dot{\psi}$: it is zero if the aircraft is not turning, which is the usual case because of above described yaw stabilization; it is of the same sign as P if the aircraft is initially turning in the direction called for by P and the pilot increases the pedal pressure to increase the yaw rate; it is of opposite sign to P if the aircraft is initially turning in the opposite direction to that called for by P and the pilot applies opposite pedal pressure to reverse the turn direction. In any event the difference signal $P - \dot{\psi}$ causes servomotor 23 to change the pitch of the tail-rotor blades in the direction required to turn the helicopter in the direction called for by the pilot through his foot pressure on the pedals 5. The pedals follow through on this pitch change since the force sensors 39 and 40 do not interfere with the conventinal mechanical coupling between the pedals and the pitch adjusting mechanism. The servomechanism continues to change the rotor blade pitch until the yaw rate achieved is such that the yaw rate signal $\dot{\psi}$ substantially equals the command signal P at summing point 38, at which rate it stabilizes. Consequently the yaw rate is proportional to the pedal pressure. The helicopter continues to turn about the yaw axis at a rate proportional to pedal pressure for as long as pedal pressure is applied.

When pedal pressure is released the command signal P drops to zero. This releases relay K–1 and re-establishes the already described yaw stabilization system. The stabilization system simply treats the yaw rate that the helicopter has at the time pedal pressure is released as a disturbance, producing, as already described, a servo control signal $\dot{\psi}+\psi$, the rate term $\dot{\psi}$ of which damps the disturbance and the time integral term $\psi$ of which counterrotates the helicopter to the angular position about the yaw axis that it had at the time pedal pressure was released. This action takes place rapidly so that as a practical matter the helicopter stops turning and becomes stabilized in direction almost immediately after pedal pressure is removed without any noticeable overshoot.

In forward flight, the yaw control system of FIG. 2 also provides for automatic or selectively automatic turn coordination in certain true airspeed ranges. A coordinated turn is one in which the bank angle and the yaw rate are coordinated to produce a turn with zero side slip.

At speeds below a preselected high taxi speed, for example 20 m.p.h., no automatic turn coordination is provided since coordinated turns at low speeds require an impracticably high yaw rate. If a coordinated turn is desired in this speed range it must be manually accomplished by the pilot through banking the helicopter by the cyclic stick and holding the correct amount of pedal pressure in the direction of the turn.

At speeds from high taxi (20 m.p.h.) to a suitable low cruise speed, for example 35 m.p.h., the pilot can choose between automatically coordinated turn and lateral movement. For a coordinated turn, the pilot must bank the helicopter in the turn direction, by means of the cyclic stick, by at least 5°, or other suitable small angle, and apply pedal pressure sufficient to produce a definite yaw rate in the desired direction, for example, one in excess of 2°/sec. To execute a lateral movement rather than a coordinated turn, the yaw rate is kept below 2°/sec. by applying force to the opposite pedal if necessary.

Above low cruise (35 m.p.h.) all turns are automatically coordinated, the turn being executed by simply moving the cyclic stick to bank the craft in the desired turn direction. Nevertheless, if the pilot chooses, he may forcibly override the system and move latterally by the application of hard opposite pedal. This is not normally a desirable maneuver however and, since the pedal force required is considerable, there is little chance of inadvertently entering into this condition.

Automatic turn coordination requires a computer to arrive at the proper yaw rate $\omega_t$, which is given by the relationship $$\omega_t = \frac{g}{V_T} \sin \phi$$

where $g$ = the acceleration of gravity
$V_T$ = true airspeed
$\phi$ = bank angle.

The computer in FIG. 2 comprises true airspeed signal generator 45 driven by a small windmill 46 having its spin axis parallel to the longitudinal or roll axis of the helicopter. A signal proportional to the acceleration of gravity $g$ and the true airspeed signal $V_T$ are applied to divider 47 to obtain the quotient signal $g/V_T$ which in turn energizes a sine resolver 48 positioned to the bank angle $\phi$ by vertical gyro 49 to produce the computed yaw rate signal $$\frac{g}{V_T} \sin \phi$$

The contacts of relay K–2 serve to inject the computed yaw rate $\omega_t$ into the control system at summing point 37 when the conditions for automatic turn coordination are present as set forth above. K–2 is a polarized relay having two coils 50 and 51 which produce opposite fluxes. When coil 50 is energized, contacts $a$–$b$ of K–2 are closed grounding the $\omega_t$ input to point 37. When coil 51 is energized contacts $a$–$c$ are closed connecting the output of sine resolver 48, which is the computed yaw rate $\omega_t$ for automatic turn coordination, to summing point 37. Energization of coil 51 is also accompanied by energization of a second coil 52 on relay K–1, insuring that integrator 36 is removed from the circuit and the yaw directional stabilization function thereby disabled during a coordinated turn.

The energization of coils 50 and 51 of K-2 is controlled by a switching network 53 which receives as inputs a signal $\dot{\psi}$ proportional to yaw rate from rate gyro 35, a signal $V_T$ proportional to true airspeed from air speed signal generator 45, and a signal $\phi$ proportional to bank angle from vertical gyro 49. The switching operation performed by network 53 is as follows, using the air speed parameters given as examples above: When $V_T$ is less than 20 m.p.h., coil 50 of K-2 is energized and contacts $a$-$c$ are open so that no turn coordination occurs. When $V_T$ lies in the range 20-35 m.p.h. and, in addition, $\phi$ exceeds 5° and $\dot{\psi}$ exceeds 2°/sec., coil 51 is energized and contacts $a$-$c$ are closed for turn coordination; however, if these two additional conditions are not both present, coil 50 is energized and contacts $a$-$c$ open for no turn coordination. When $V_T$ exceeds 35 m.p.h. and the bank angle exceeds 5°, coil 51 is energized and contacts $a$-$c$ closed for coordination of all turns.

When contacts $a$-$c$ of K-2 are closed the computed yaw rate $\omega_t$ is applied to summing point 37. Here the rate signal $\dot{\psi}$ from the rate gyro 35 is subtracted from $\omega_t$ to produce the servo control signal $\omega_t$-$\dot{\psi}$ which is applied to servomechanism 19 by way of summing point 38 and line 20. By the same process as that already explained for the pilot produced command signal P, the servomechanism 19 operates in response to this signal to change the tail rotor blade pitch by the amount required to produce a yaw rate proportional to $\omega_t$. An automatically coordinated turn in the 20-35 m.p.h. range may be terminated by reducing the bank angle $\phi$ below 5° with the cyclic control stick. This will energize coil 50 and open contacts $a$-$c$. A coordinated turn above 35 m.p.h. may be terminated by reducing the bank angle below 5° which opens contacts $d$-$e$ of K-5 de-energizing coils 51 and 52.

In order that the pilot may be able at any time to easily disconnect the above-described yaw control system from the manual yaw control mechanism of the helicopter, a switch is located at the outer end of the right pedal 5 and controlled by a small pedal 54. This is designed so that a sidewise movement of the pilot's foot against pedal 54 disengages clutch 25 at servomotor 23 thereby disconnecting the servomotor from the tail rotor pitch control mechanism. A downward pressure on pedal 54 serves to re-engage the clutch. Override clutch 24 is a required safety feature permitting the pilot to manually actuate the controls by forced slippage of the clutch should all else fail.

The yaw control and stabilizing system of FIG. 2 may be realized from any of the presently known elements and techniques used in control systems that are capable of performing the functions illustrated in FIG. 2 and described above. These may be mechanical, electrical, hydraulic, or any other. FIGS. 3-7 show an electrical construction based primarily on alternating current techniques.

FIG. 3 shows a suitable design for the force sensors 39 and 40 which are inserted in the pull rods 6 and 7 as seen in FIG. 2. Tension in the rods causes the inner member 55 to tend to pull out of the outer member 56 by compressing spring 57, which may be preloaded a desired amount by nut 58, the reaction being against retainer 59. Compressional forces, though not used in FIG. 2 are transmitted in a similar manner except that member 55 tends to move into outer member 56 by compressing spring 57, the reaction in this case being against shoulder 60. Relative movement of the inner and outer members 55 and 56 causes a rod 61 carried by the inner member to move relative to a housing 62 attached to the outer member. Housing 62 contains the windings of a differential transformer the movable core of which is attached to rod 61. A schematic diagram of the transformer is shown in block 39 of FIG. 5. The head 63 of rod 61 is threaded into member 55 and accessible by a screwdriver through the end of the member to permit adjustment of the transformer output to zero for zero force on the sensor.

Figure 4:
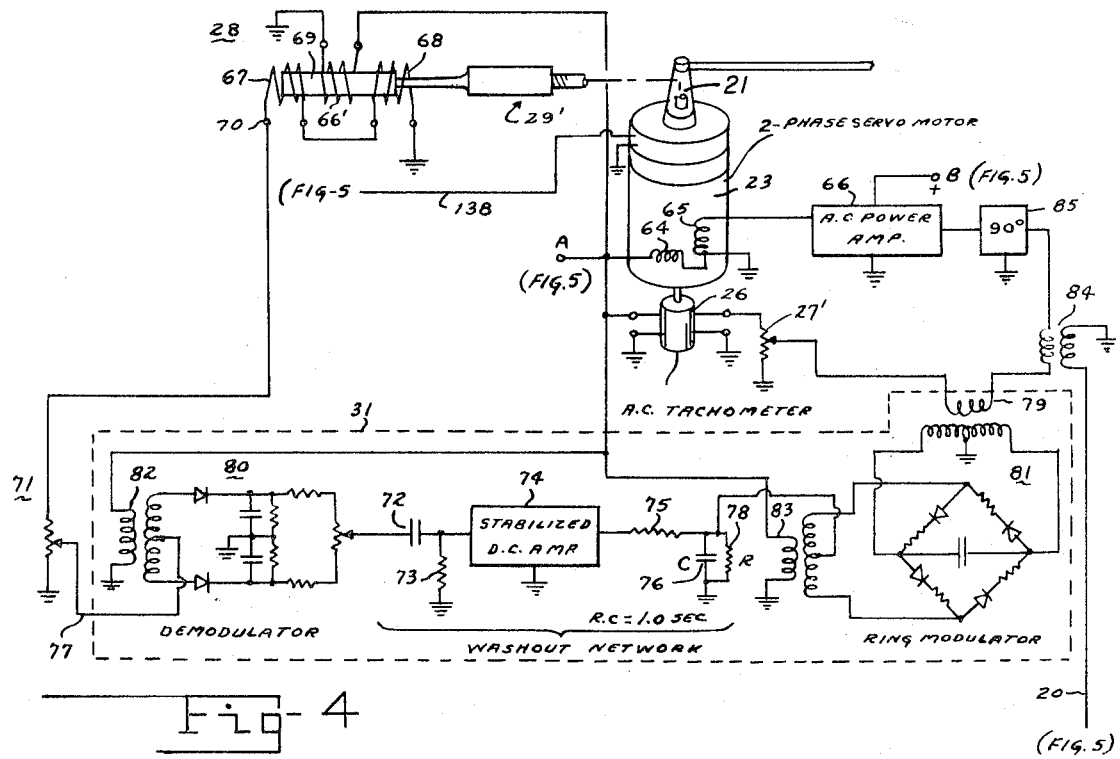
FIG. 4 is a schematic diagram of an embodiment of the inner servo loop 19 of FIG. 2.

FIG. 4 is a schematic diagram of the servomechanism 19 of FIG. 2. Servomotor 23 is a two-phase motor having a fixed phase winding 64 connected to A.C. power point A (FIG. 5) and a variable phase winding 65 energized from power amplifier 66. The A.C. tachometer 26 is of the two-winding drag cup type as described for instance in the Radiation Laboratory Series, vol. 17, Components Handbook, page 384, McGraw-Hill, 1949. One winding is connected to point A for constant A.C. energization. The A.C. output from the other winding is in time phase with that at point A and has an amplitude proportional to the speed of servomotor 23. This output is applied to potentiometer 27' which serves the purpose of gain adjuster 27 in FIG. 2. The position transducer 28 is a differential transformer having a primary winding 66', receiving constant A.C. energization from point A, and two equal secondary windings 67 and 68 connected in series and in phase opposition. Magnetic core 69 of the transformer is movable axially of the windings and controls the relative coupling between the primary and the two secondaries. In a central or neutral position the two couplings are equal and the output at terminal 70 is zero. Displacements from this neutral position produce A.C. outputs with amplitudes substantially proportional to the displacement over the range used and phases either the same as or opposite to the primary phase depending upon the direction or sense of the displacement. Core 69 is coupled by a nut and screw arrangement 29' to arm 21 for linear movement proportional to the angular movement of the arm. With arm 21 in its neutral position, which is the position in which the blades of tail rotor 4 have their neutral pitch, as already defined, the coupling 29' is so adjusted that core 69 is in its neutral position and the signal at terminal 70 is zero.

The output of transducer 28 is applied through level adjuster 71 to the input of washout circuit 31. As explained for FIG. 2, the washout circuit has an output proportional to the time integral of the rate of change of the amplitude of its input signal, but holds this output only for about one second after the input signal amplitude has ceased to change. This operation is performed by the washout network which consists of differentiating circuit made up of capacitor 72 and resistor 73, a stabilized D.C. amplifier 74, such, for example, as a chopper stabilized amplifier, and an integrating circuit made up of resistor 75 and capacitor 76. Since the washout network is a D.C. network, it is necessary to convert the A.C. input signal on line 77 to a D.C. signal and the D.C. output signal of the network developed across resistor 78 back to an A.C. signal at output winding 79 of the same phase as the input A.C. signal. These conversions are the functions of demodulator 80, which is a phase sensitive rectifier, and ring modulator 81, respectively. In order to preserve the phase of the A.C. input signal, both the demodulator and the ring modulator are provided with the same reference phase, derived from point A and applied to windings 82 and 83, so that the polarity of the D.C. output of demodulator 80 depends upon the phase of the A.C. input signal relative to the reference phase and the phase of the ring modulator output relative to the reference phase depends upon the polarity of its D.C. input signal.

Adding the speed feedback signal from tachometer 26 and the feedback signal from washout circuit 31, occurring at point 32 in FIG. 2, is accomplished in FIG. 4 by connecting level adjuster 27' and output winding 79 in series. The servo control signal on input line 20 is also injected into this series circuit by transformer 84, this occurring at summing point 33 in FIG. 2. Since, as stated in the explanation of FIG. 2, both feedbacks are negative feedbacks, it is the difference between the servo control signal and the two feedback signals that, after a 90° phase shift in network 85, is applied as the input signal to power amplifier 66 for controlling the energization of motor winding 65. The purpose of phase shifter 85 is to provide the quadrature phase relation between the currents in the two motor windings that is required in a two-phase motor. With this arrangement, the amplitude of the servo control signal on line 20 determines the servomotor speed and its phase relative to the reference phase at point A, i.e. whether the difference from the reference phase is 0° or 180,° determines the direction of rotation.

Figure 5:
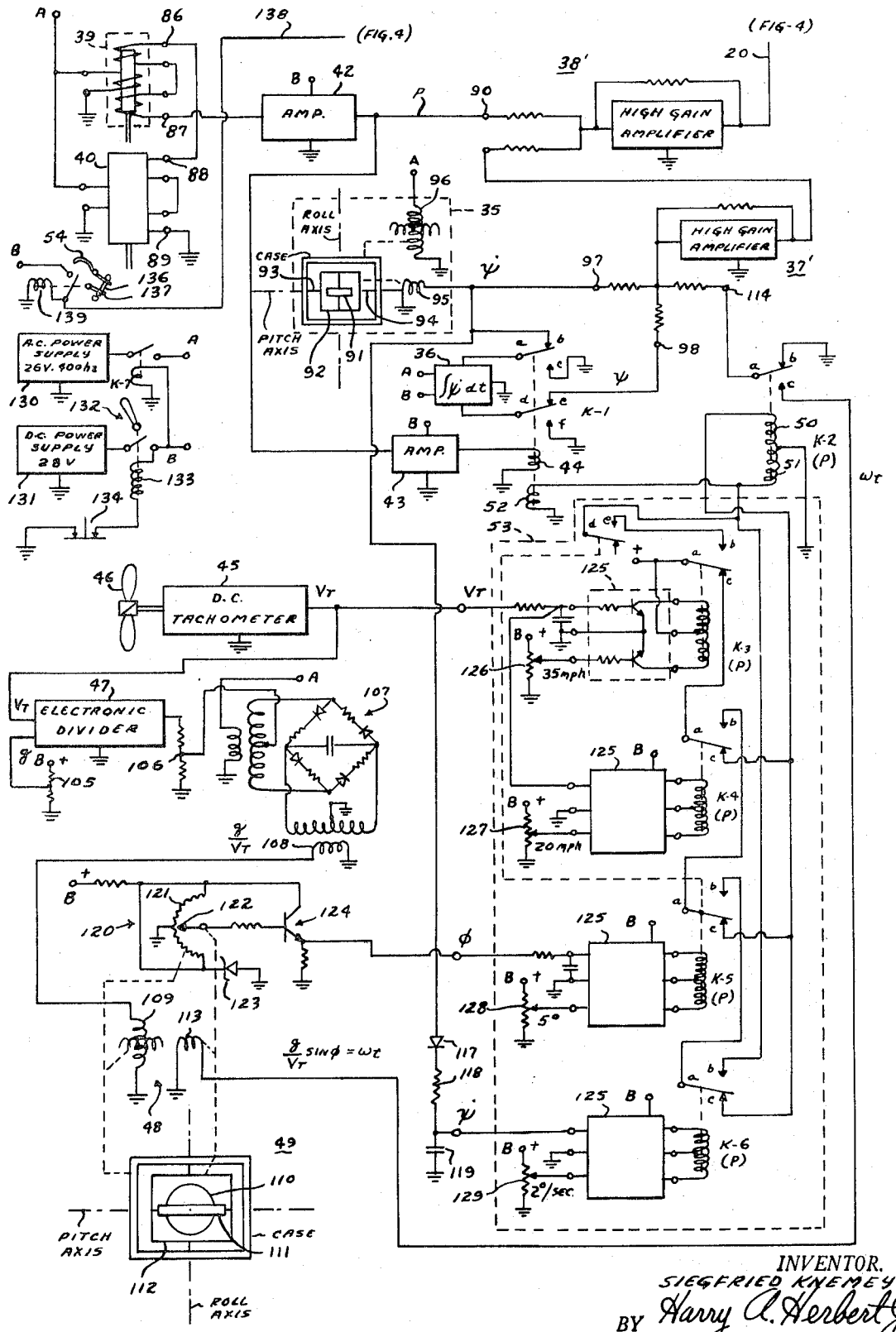
FIG. 5 is a schematic diagram of an embodiment of the outer servo loop and switching logic of FIG. 2.

FIG. 5 is a schematic diagram of the outer servo loop or that part of the yaw control and stabilization system of FIG. 2 lying outside the inner servo loop 19. Force sensors 39 and 40 are alike and may be constructed in the manner shown in FIG. 3. The displacement sensing element in the force sensor is a differential transformer shown schematically in FIG. 5 for sensor 39. The construction and operation of these transformers is the same as for displacement sensor 28 in FIG. 4, already described. The primary windings of the transformers are energized from A.C. power point A. Their outputs, which occur at output terminals 86–87 and 88–89 and are zero for zero displacement, are added in series opposition so that the combined sensor output signal appearing between terminal 87 and ground is proportional to the net force applied by the pilot to the pedals and has a time phase that is either the same as or opposite to the reference phase at point A depending upon the direction or sense of the applied force. After amplification in amplifier 42, which has stated earlier has an amplitude threshold to exclude "noise," this signal becomes the pilot produced command signal P. This signal is applied to one of the input terminals 90 of a summing amplifier 38' corresponding to the summing point 38 in FIG. 2. Summing amplifiers of this type are well known in the computer art and described in the literature, for example, in Radiation Laboratory Series, vol. 21, Electronic Instruments, First Edition, McGraw-Hill, 1948, page 33.

The yaw rate signal $\dot{\psi}$ is produced by yaw rate gyro 35. The case of the gyro is affixed to the helicopter and has its rotating element 91 in a gimbal 92 suspended from the case by torsion wires 93 and 94 which are parallel to the pitch axis of the aircraft. Rotation of the helicopter about its yaw axis, normal to the paper in FIG. 5, causes the gyro to precess about the axis of the torsion wires against the opposing force of the wires acting as torsion springs. Consequently the amount of precession and resulting rotation of gimbal 92 relative to the case is proportional to the rate of rotation of the helicopter about the yaw axis. The direction of the precession corresponds to the direction of the helicopter rotation about its yaw axis. In order to convert the rotation of gimbal 92 relative to the case into the yaw rate signal $\dot{\psi}$ there is employed a resolver having two windings spaced by 90° and fixed relative to the gyro case, and an output winding 95 rotatable relative to the fixed windings and driven by gimbal 92. Only winding 96 of the two fixed windings is utilized, this being the winding having zero coupling to winding 95 when the precession is zero. Winding 96 is energized from A.C. power plant A at the reference phase. Any rotation of gimbal 92 from its zero position about the axis of wires 93 and 94 causes an A.C. signal to be induced in winding 95 directly related in amplitude to amount of rotation and having either the reference phase or a phase angle 180° from the reference phase depending upon the direction of rotation from the zero position. The amplitude of the signal is actually proportional to the sine of the rotation angle; however, with proper selection of the gyro parameters including the stiffness of torsion springs 93 and 94, operation can be restricted to the substantially linear portion of the sine function so that a substantially linear relationship exists between the amplitude of $\dot{\psi}$ and the yaw rate. The yaw rate signal $\dot{\psi}$ is applied to one of the input terminals 97 of a summing amplifier 37' which corresponds to summing point 37 in FIG. 2 and is similar to summing amplifier 38'.

Figure 6:
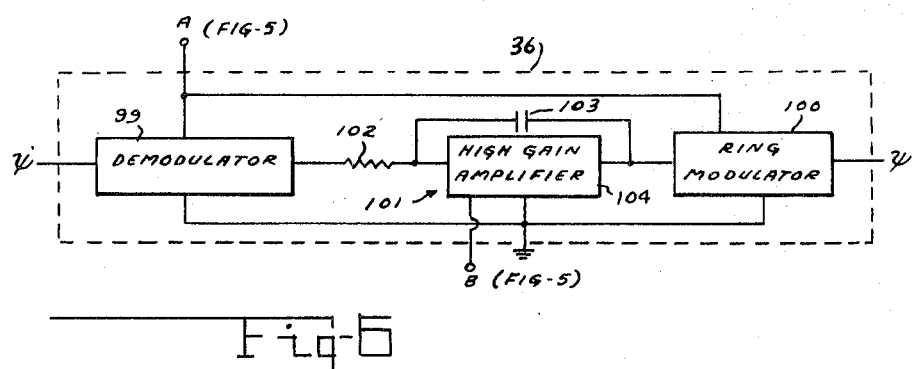
FIG. 6 shows details of the integrator 36 of FIG. 2.

As already explained for FIG. 2, the command signal P acts through amplifier 43 to actuate relay K–1 and connect integrator 36 into the control system. The resulting A.C. signal $\psi$, proportional in amplitude to the time integral of $\dot{\psi}$ and having the same phase as $\dot{\psi}$, is applied to a second input terminal 98 of summing amplifier 37'. A suitable design for integrator 36 is shown in FIG. 6. The A.C. input signal $\dot{\psi}$ is converted to a D.C. signal, the integration performed on the D.C. signal, and the D.C. signal representing the integral converted to a proportionate A.C. signal $\psi$ of the same time phase as the input signal $\dot{\psi}$. These conversions and the preservation of the phase information are accomplished by demodulator 99 and ring modulator 100 which are the same in construction and operation as demodulator 80 and ring modulator 81 in the washout circuit 31 shown in FIG. 4 and described in connection with that figure. The D.C. integrator circuit 101, comprising resistor 102, feedback capacitor 103 and high gain D.C. amplifier 104, is of a type well known in the computer art and described in the literature, for example, on page 79 of the above referenced vol. 21 of the Radiation Laboratory Series.

In the computer for the coordinated turn yaw rate $\omega_t$, the true airspeed signal generator 45 is a D.C. generator producing a direct voltage $V_T$ proportional to its speed. This voltage, along with a direct voltage proportional to the acceleration of gravity $g$, derived from D.C. potentiometer 105, is applied to an electronic divider circuit 47 which produces a unipolar D.C. signal proportional to the quotient $g/V_T$ at output point 106. This is converted to an A.C. signal of proportionate amplitude and of the same phase as the reference phase at point A by ring modulator 107 which operates in the same manner as ring modulator 81 of FIG. 4 except that phase reversals at the output do not occur since the input D.C. is always of the same polarity.

The A.C. signal proportional to $g/V_T$ at the output winding 108 of ring modulator 107 is applied to one of the windings 109 of a two-winding resolver 48 associated with vertical gyro 49. The spinning element 110 of the gyro is mounted in a gimbal 111 which is free to rotate in gimbal 112 which in turn is free to rotate in the gyro case which is fixed relative to the helicopter. Consequently, the spin axis of the gyro remains vertical during pitch and roll movements of the aircraft. Banking the helicopter, or causing it to rotate about its roll axis, which may be accomplished by the cyclic control stick, causes the case to rotate relative to gimbal 112. Winding 109 of the resolver is fixed relative to the gyro case whereas rotatable winding 113 is fixed relative to gimbal 112. When the bank angle $\phi=0$, the coupling between windings 109 and 113 is zero producing zero output from the resolver. When the helicopter is banked winding 113 rotates relative to winding 109 by the amount of the bank angle $\phi$ and an A.C. output signal is produced that is proportional in amplitude to $g/V_T$ and the sine of $\phi$, and has a 0° or 180° phase relation to the reference phase at A depending upon banking direction. The resulting $\omega_t$ signal is applied to the third input terminal 114 of summing amplifier 37' through contacts a–c of relay K–2 when these contacts are closed, as already explained.

The electronic divider 47 may be a D.C. analog divider of the type illustrated in FIG. 7. This type, described on pages 3–58 of Computer Handbook. Huskey and Korn, first edition, 1952, McGraw-Hill, comprises a high gain D.C. amplifier 115 to the input of which the dividend $g$ is applied and a multiplier 116 in the feedback circuit to one input of which the divisor $V_T$ is applied. The multiplier 116 may be of the type shown on pages 3–57 of this handbook.

As shown in FIG. 2 and as previously explained, switching network 53 receives inputs proportional to $V_T$, $\phi$, and $\dot{\psi}$. In the embodiment of this network shown in FIG. 5, all three are D.C. inputs. The $V_T$ input is obtained directly from D.C. tachometer 45; the $\dot\psi$ input is obtained by rectifying and filtering the A.C. $\dot\psi$ signal from rate gyro 35, using diode 117 and filter network 118–119 for this purpose; and the $\phi$ input is obtained from an additional transducer 120 on vertical gyro 49. This transducer comprises a center tapped adjustable potentiometer having its resistance element 121 fixed relative to the gyro case and its movable contact 122 fixed relative to gimbal 112. Since only the magnitude of the bank angle is of interest in this case, both ends of the resistance element have the same polarity relative to the grounded center tap. The energizing direct voltage may be stabilized if required by Zener diode 123. The output voltage, which is proportional to $\phi$, is coupled to the $\phi$ input of network 53 by an emitter follower stage 124.

The switching network 53 contains four similar polarized relays K–3 through K–6. Each has a center tapped winding so that currents flowing away from the center tap in the two halves produce opposing fluxes. If the current in the upper half is greater than in the lower half the contacts $a$–$b$ are closed and the contacts $a$–$c$ are open; whereas, if the current in the lower half predominates, the contacts $a$–$c$ are closed and the contacts $a$–$b$ are open. Coil energization for each of the relays is controlled by a transistor differential amplifier network 125. The base potentials of the lower transistors in networks 125 are adjusted to preselected reference values by adjustable D.C. potentiometers 126–129, whereas the bases of the upper transistors receive the variable inputs to the switching network 53. In agreement with the previously given examples, potentiometers 126–129 are set to voltage analogs of 35 m.p.h., 20 m.p.h., 5° and 2°/sec., respectively. The $V_T$ input is applied to the upper transistors for relays K–3 and K–4, the $\phi$ input to the upper transistor for relay K–5, and the $\dot\psi$ input to the upper transistor for relay K–6. When these input analogs exceed the reference analogs the energizations of the upper relay coils predominate, when smaller the energizations of the lower coils predominate. To prevent erratic operation of the relays, delays of a second or more are introduced as by inserting R–C integrating circuits in the inputs to the upper transistors of circuits 125 in the manner shown. In the case of relay K–6, the filter circuit 118–119 may also serve this purpose.

Switching network 53 operates to apply direct voltage from point B to either coil 50 or coil 51 of relay K–2 depending upon the conditions of relays K–3 through K–6, which in turn depend upon the values of the inputs $V_T$, $\phi$, and $\dot\psi$. If $V_T > 35$ m.p.h. and $\phi > 5°$, voltage is applied through contacts $a$–$b$ of K–3 and $d$–$e$ of K–5 to coil 51 of K–2 closing its contacts $a$–$c$ and applying $\omega_t$ to the control system for a coordinated turn. If $V_T < 20$ m.p.h., voltage is applied through contacts $a$–$c$ of K–3 and contacts $a$–$c$ of K–4 to coil 50 of K–2 opening its contacts $a$–$c$ and preventing $\omega_t$ from reaching the control system. If $V_T$ lies in the range 20–35 m.p.h., $\phi$ must exceed 5° and $\dot\psi$ must exceed 2°/sec. in order for coil 51 of K–2 to be energized for a coordinated turn, the voltage reaching this coil through contacts $a$–$c$ of K–3, $a$–$b$ of K–4, $a$–$b$ of K–5, and $a$–$b$ of K–6. Otherwise, if $\phi < 5°$, the voltage is applied through contacts $a$–$c$ of K–4 to coil 50, opening contacts $a$–$c$ of K–2; or, if $\phi > 5°$ but $\dot\psi < 2°$, the voltage is applied through contacts $a$–$b$ of K–5 and contacts $a$–$c$ of K–6 to coil 50, opening contacts $a$–$c$ of K–2. As stated for FIG. 2, whenever coil 51 of K–2 is energized, coil 52 connected in parallel thereto is energized to remove the integrator 36 from the control system during a coordinated turn.

The circuits of FIGS. 4 and 5 are energized by A.C. and D.C. power supplies 130 and 131. Manual closure of master power switch 132 energizes D.C. source point B and its own holding coil 133 through normally closed emergency release button 134. Voltage at point B closes relay K–7 energizing A.C. power point A. Clutch 25 on servomotor 23 (FIG. 4) may be energized by depressing pedal 54 which closes switch 135 through push-pull link 136 and toggle 137. Closure of switch 135 energizes clutch 25 (FIG. 4) over line 138 and also its holding coil 139. A sidewise motion of the pilot's foot can overcome the force of the holding coil and open the switch, which also de-energizes the holding coil so that downward pressure must be applied to pedal 54 to reclose the switch. Pressing emergency pushbutton 134, which is usually conveniently located on the cyclic control stick of the helicopter, de-energizes master switch holding coil 133 removing all power from the system.

The foregoing description of the yaw control and stabilization system as applied to a small helicopter of the type shown in FIG. 1 was for illustrative purposes only. The system as described may be applied to the yaw control mechanism of any aircraft, taking into account of course the necessity for adaptation to the mechanical and aerodynamic pecularities of the particular aircraft. Its application to single rotor helicopters is of particular advantage, however, since the yaw stabilization provided relieves the pilot of the constant attention to the yaw control that is otherwise required due to the change in yawing moment that accompanies any change in main rotor torque.

Likewise the specific form in which the yaw control and stabilization system is shown in FIGS. 3–7 is for illustrative purposes only. Any known components and techniques that are capable of performing the functions illustrated and described for the functional diagram of FIG. 2 and are capable of cooperating with the other elements of the system may be used. Also, the given $V_T$ speeds of 35 and 20 m.p.h., the 5° bank angle and the 2°/sec. yaw rate are not critical but may be varied to suit the particular aircraft and the use to which it is to be put. For example, for fixed wing aircraft, the lower speed value could be set at 10% below stall speed and the higher speed value could be set at 15% above normal landing approach speed. The computed yaw rate $\omega_t$ for turn coordination can also be derived from a slip sensor or lateral accelerometer as it is done in most of today's autopilots.

I claim:

1. In combination with an aircraft having a yaw control mechanism actuatable by the pilot through yaw control pedals linked to the yaw control mechanism in such manner that a fixed correspondence exists between pedal position and control mechanism position: a servomechanism coupled to said yaw control mechanism and having a control signal input, said servomechanism operating in response to a control signal applied to its input to actuate the yaw control mechanism at a rate proportional to the magnitude of the applied control signal and in the direction specified by the control signal; force sensing means in the linkage between said pedals and the yaw control mechanism for producing a signal P proportional to the net force applied to said linkage through said pedals by the pilot and indicative of the force direction; means for producing a signal $\dot\psi$ proportional to the yaw rate of the aircraft and indicative of its direction; means for applying a signal proportional to the difference between P and $\dot\psi$ to the input of said servomechanism thereby producing a yaw rate proportional to P and in the direction indicated by P; integrating means; and means responsive to P and operative only when P is zero, indicating removal of force from said pedals, to apply $\dot\psi$ to said integrator for producing a signal $\psi$ proportional to the time integral of $\dot\psi$, and to apply $\psi$, together with $\dot\psi$, to the input of said servomechanism to stabilize the aircraft in yaw at the yaw direction it had at the instant pedal force was removed.

2. Apparatus as claimed in claim 1, and in addition: means producing a signal $V_T$ proportional to the true airspeed of the aircraft; means for measuring the bank angle of the aircraft and for producing a signal $\phi$ proportional to the bank angle and indicative of the bank direction; means receiving $V_T$ and $\phi$ as inputs for producing a signal $\omega_t$ proportional to the yaw rate required for a coordinated turn; and means receiving $V_T$, $\phi$ and $\dot{\psi}$ as inputs for removing $\dot{\psi}$ from the input to said servomechanism and introducing $\omega_t$, together with $\dot{\psi}$, as an input to the servomechanism whenever $V_T$ exceeds a preset upper value and the absolute value of $\phi$ exceeds a preset low value representing a preselected low bank angle, and also when $V_T$ lies between said upper value and a preset lower value, $\phi$ exceeds said low value, and the absolute value of $\dot{\psi}$ exceeds a preset low value representing a preselected low yaw rate.

References Cited

UNITED STATES PATENTS

| 2,865,337 | 12/1958 | Dennis et al. | 244—77 X |
| 3,071,335 | 1/1963 | Carter | 244—17.13 X |

MILTON BUCHLER, Primary Examiner

J. L. FORMAN, Assistant Examiner

U.S. Cl. X.R.

244—17.13, 83